United States Patent [19]

Horibe et al.

[11] Patent Number: 4,959,576
[45] Date of Patent: Sep. 25, 1990

[54] AUTOMOTIVE ALTERNATOR

[75] Inventors: Mitsutoshi Horibe, Anjo; Hiroshi Hamada, Kariya; Hiroshi Sakakibara, Aichi, all of Japan

[73] Assignee: Nippondenso Co., Ltd., Kariya, Japan

[21] Appl. No.: 274,856

[22] Filed: Nov. 22, 1988

[30] Foreign Application Priority Data

Nov. 25, 1987 [JP] Japan .................... 62-296894
Apr. 26, 1988 [JP] Japan .................... 63-103408

[51] Int. Cl.⁵ .................................................. H02K 13/00
[52] U.S. Cl. ...................................... 310/239; 310/88; 310/89; 310/232
[58] Field of Search ............ 310/88, 263, 239, 232, 310/68 D, 45, 89, 242

[56] References Cited

U.S. PATENT DOCUMENTS

| | | | |
|---|---|---|---|
| 3,233,130 | 2/1966 | Bates | 310/88 |
| 3,731,126 | 5/1973 | Hagenlocher | 310/88 |
| 4,100,440 | 7/1978 | Binder | 310/68 D |
| 4,311,935 | 1/1982 | Hoyss | 310/239 |
| 4,384,225 | 5/1983 | Iwaki | 310/88 |
| 4,404,487 | 9/1983 | Nimura | |
| 4,499,390 | 2/1985 | Iwaki | 310/88 |
| 4,680,495 | 7/1987 | Chiampas | 310/68 D |
| 4,705,983 | 10/1987 | Franz | 310/68 D |

FOREIGN PATENT DOCUMENTS

| | | | |
|---|---|---|---|
| 2757485 | 6/1978 | Fed. Rep. of Germany . | |
| 2941153 | 4/1980 | Fed. Rep. of Germany . | |
| 2256575 | 7/1975 | France . | |
| 57-1077 | 1/1982 | Japan . | |
| 58-51663 | 4/1983 | Japan . | |
| 59-169350 | 9/1984 | Japan . | |
| 2196488 | 4/1988 | United Kingdom | 310/239 |

Primary Examiner—R. Skudy
Attorney, Agent, or Firm—Cushman, Darby & Cushman

[57] ABSTRACT

An automotive AC generator or alternator has a protective structure for fluid-tightly closing a brush unit and its associated components to thereby prevent water or oil from entering thereinto. The protective structure includes a brush holder for encasing brushes and a slip ring cover for covering slip rings. The brush holder and the cover are coupled to each other with axial recesses being engaged with associated projections. The thus coupled brush holder and slip ring cover are fixed while being pressed in the axial direction toward a rear frame of the alternator by a rear cover thereof with a seal member interposed between axial end faces of the brush holder and slip ring cover and the rear frame and with another seal member interposed between the other axial end faces of the brush holder and slip ring cover and the rear cover.

9 Claims, 8 Drawing Sheets

AUTOMOTIVE ALTERNATOR

BACKGROUND OF THE INVENTION

The present invention relates to an automotive alternating current (AC) generator or alternator provided around a brush with a seal structure.

In an automotive AC generator or dynamo, it is necessary to provide a protective structure for preventing the invasion of water, oil or the like into a brush portion in which disposed are slip rings, brushes and a brush holder.

As a typical example of a conventional protective structure of this kind, as illustrated in the drawings of Japanese Utility Model Unexamined Publication No. 57-1077, there is a structure in which a semi-cylindrical slip ring cover is formed integrally with a rear frame of an alternator, and a brush holder is assembled with respect to the cover through a seal rubber.

In this typical structure, the seal rubber includes a seal portion for covering axial end faces of the slip ring cover and the brush holder and another seal portion to be inserted between the slip ring cover and the brush holder. These seal portions are formed integrally with each other as shown in, for example, the drawings of Japanese Utility Model Unexamined Publication No. 58-51663. In the assembling of this structure, the brush holder is positioned on the rear frame of the alternator with the seal portion of the seal rubber interposed between the brush holder and the slip ring cover. Subsequently, the other portion of the seal rubber is pressed in the axial direction of the alternator by fixing the rear cover for covering the brush portion and its neighborhood to the rear frame, thereby performing the seal of the brush portion in the radial and axial directions thereof.

SUMMARY OF THE INVENTION

The invention has an object of providing an automotive AC generator or alternator provided with a protective structure for performing the seal with only a compression force in the axial direction of the alternator.

Another object of the invention is to provide an automotive alternator having a protective structure which is capable of securely sealing the same irrespectively of the assembling precision of structural components of the protective structure.

The present invention is based upon an inventive concept that a slip ring cover is formed independently of a rear frame of an alternator and is engaged with a brush holder to thereby perform the radial seal of them, whereas seal members are provided for performing the axial seal between the contact surfaces of the rear frame and the slip ring cover and the seal of the other axial end face of the slip ring cover.

According to one aspect of the present invention, there is provided an automotive alternator comprising: a rotor around which a rotor coil is wound, the rotor having a rotary shaft adapted to be driven by an automotive engine; a frame for encasing the rotor; slip rings provided at one end of the rotary shaft extending outside of the frame and electrically connected to the rotor coil; a brush holder having receiving portions for encasing brushes that are in sliding contact with the slip rings; a cover body having in a side thereof an opening through which the brushes extend, the cover body being arranged around an outer periphery of the slip rings for covering the slip rings in cooperation with the brush holder; seal members interposed between the frame, brush holder and the cover body for sealing the same; and a rear cover for encasing the brush holder, cover body and the seal members, wherein the brush holder has a pair of recesses or projections formed on both sides of the receiving portions and extending in an axial direction of the rotary shaft, the cover body includes a cylindrical portion substantially equal in axial length to the brush holder, the cylindrical portion has recesses or projections sealingly engageable with the recesses or projections of the brush holder, the seal members are provided between the frame and the brush holder and cover body and between the brush holder and cover body and the rear cover, respectively, and the brush holder, the cover body and the seal members are assembled while being pressed in the axial direction toward the frame by the rear cover.

According to another aspect of the present invention, there is provided an automotive alternator comprising: slip rings mounted on a rotary shaft for rotation therewith; a brush holder having receiving portions for receiving brushes that are in sliding contact with the slip rings; a slip ring cover for covering the slip rings in cooperation with the brush holder; and seal members for sealing the slip rings in cooperation with the brush holder and the slip ring cover, wherein the brush holder has recesses or projections respectively formed on both sides of the receiving portions and extending in an axial direction of the alternator, the slip ring cover has at both ends thereof engagement portions that are to be sealingly engaged with the recesses or projections of the brush holder, respectively, the seal members are disposed on opposite axial end faces of the brush holder and the slip ring cover, which are coupled to each other with the recesses or projections and the engagement portions being engaged in close contact with each other, and assembled while being subjected to a compression force in the axial direction, the brush holder and the slip ring cover are formed with one of the recesses or projections and the engagement portions being longer in axial length than the other, so that when the recesses or projections are engaged with the engagement portions, a step of a predetermined axial length is produced between the recesses or projections and the engagement portions, and one of the recesses or projections and the engagement portions which are longer than the other in axial length are made of thermoplastic resin, whereby the step which is produced when the recesses or projections are engaged with the engagement portions is made smooth through a heat treatment and thereafter the brush holder and the spring cover are assembled in place.

DETAILED DESCRIPTION OF THE PREFERRED EMBODIMENTS

At the outset, analyses of problems inherent in the prior art will be explained, it should be noted that these analyses constitute a part of the invention.

Figure 17:
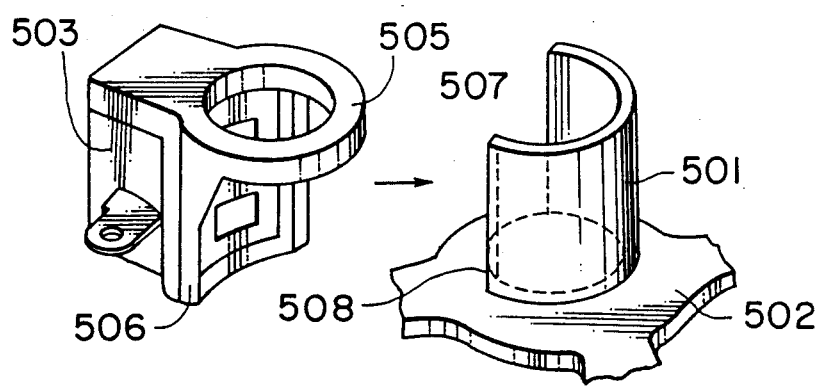
FIG. 17 is a view for explaining the analyses of problems inherent in the prior art seal structure, which analyses constitute a part of the invention.

Referring now to FIG. 17, in the conventional protective structure described before, a semi-cylindrical slip ring cover portion 501 is formed integrally with a rear frame 502 of a generator by means of aluminum die casting or the like. A seal rubber includes a seal portion 505 for covering axial end faces of the slip ring cover portion 501 and a brush holder 503 and another seal portion 506 extending from the portion 505 downwardly in the axial direction of the alternator. In this structure, the seal portion 505 is inserted between the end face of the slip ring cover portion 501 and a rear cover of the alternator, and is pressed by the rear cover in the axial direction to seal the shaft end portion. Also, the other seal portion 506 is interposed between the slip ring cover portion 501 and the brush holder 503, and the brush holder 503 is pressed in a radial direction of the alternator to seal portions of the brush holder 503 around an opening thereof for the brushes.

However, in the above-described conventional structure, as the seal portions 505 and 506 have to seal the structure at the same time in the axial and radial directions, respectively, the seal effects at corners 507 and 508 might not be ensured due to variations in size of the component parts of the structure or variations in position of the brushes, the seal rubber or the like when fixed in place. As a result, the conventional structure would, suffer from such a problem that oil or the like might enter, in particular, through these corners into the structure to cause the brush, the slip ring and the like to be worn abnormally.

Preferred embodiments of the invention will now be described with reference to FIGS. 1 to 16.

Figure 1:
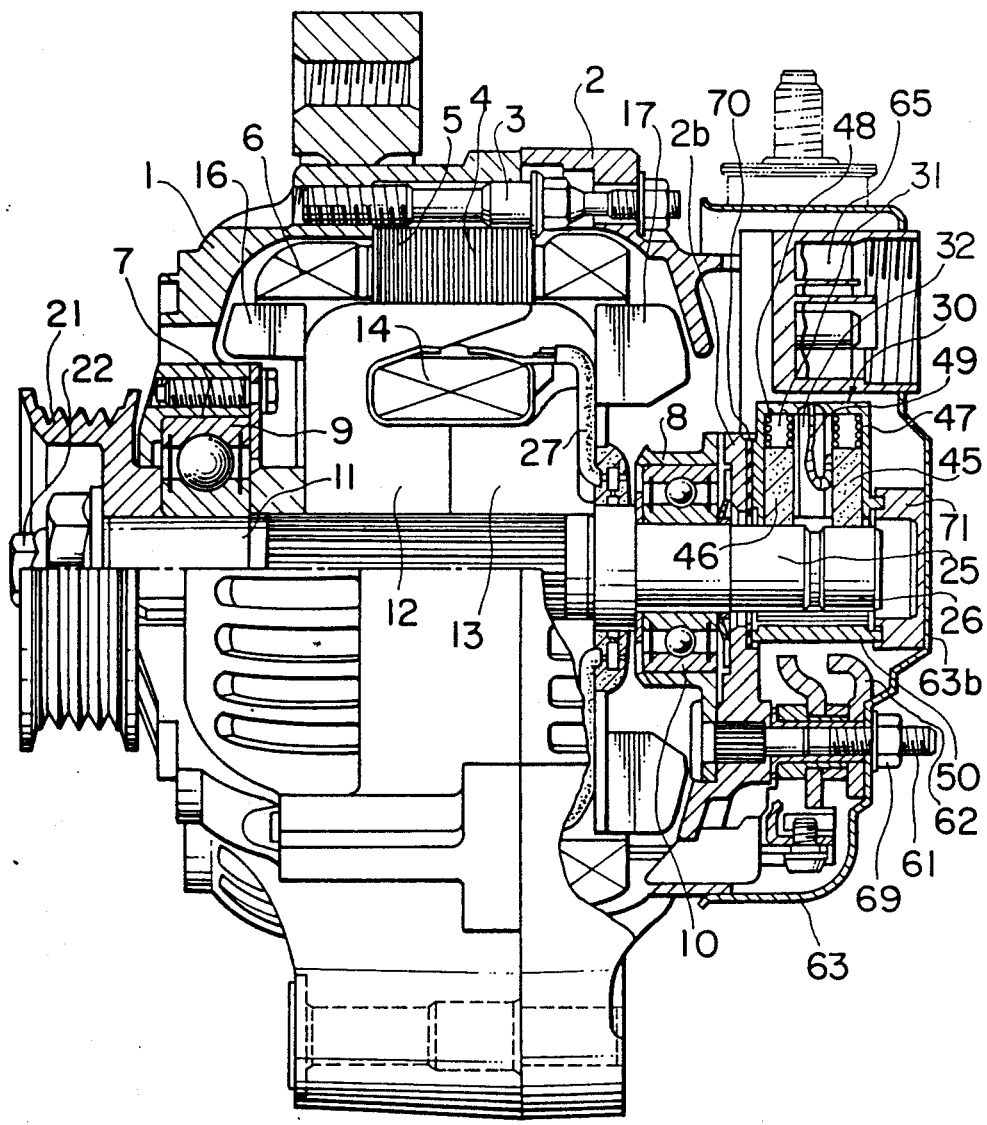
FIG. 1 is a partial cross-sectional view showing an automotive alternator in accordance with a first embodiment of the invention.

An alternator, shown in FIG. 1, in accordance with the first embodiment of the invention comprises a front frame 1 and a rear frame 2 that are made of an aluminum alloy and constitute an outer shell. Each of these frames is substantially cup-shaped. The frames are coupled to each other by a plurality of bolts 3, only one of which is shown in FIG. 1, with their opening edges being held in contact with each other. A stator 4 is mounted on an inner circumferential portion of the front frame 1. The stator 4 is composed of a stator core 5 and a stator coil wound around the stator core 5 as well known in the art.

In the central portions of side walls of the frames 1 and 2, there are integrally provided cylindrical bearing boxes 7 and 8 each of which projects inwardly of the alternator. Bearings 9 and 10 are mounted in the bearing boxes 7 and 8, respectively and are adapted to rotatably support a shaft 11. A rotor core is fixed to the shaft 11 so that the rotor core is located within the stator 4. The rotor core has a pair of pole cores 12 and 13 each of which are provided with a plurality of claw portions and which are assembled together such that the claw portions thereof are engaged with each other. A rotor coil 14 is clamped between the claw portions of the pole cores 12 and 13.

Centrifugal cooling fans 16 and 17 made of metal are fixed to the side faces of the pole cores 12 and 13 coaxially with the shaft 11, respectively. Blades of the fans 16 and 17 are directed toward the outside with respect to the pole cores 12 and 13. Also, the fan 16 is of a slant flow type which has the blades directed in the rotational direction of the rotor in order to blow the air into the pole cores 12 and 13 to cool the rotor coil 14.

A pulley 21 is mounted by a nut 22 on an end portion of the shaft 11 that projects outwardly from the front frame 1. An engine of a motor vehicle is drivingly connected to the shaft 11 through the pulley and a V-belt (not shown). Slip rings 25 and 26 made of copper or stainless steel are attached to the other end portion of the shaft 11 that projects outwardly from the rear frame 2. The slip rings are electrically connected to the rotor coil 14 through wires 27.

On the outside of the rear frame 2, there are arranged a pair of brushes 45 and 46 made of electric graphite or metal graphite, a brush holder 30 for holding these brushes and pigtails 49 connected to the brushes, a cover member, i.e., slip ring cover 50 for covering the slip rings in cooperation with the brush holder, and other components such as rectifier 62 and an IC regulator 65. These structural components are covered by a rear cover 63 which is mounted onto the rear frame 2 by a plurality of bolts 61.

The brushes 45 and 46 are pressed against the slip rings 25 and 26 by brush springs 47 and 48 received in the brush holder 30, and are brought into sliding contact with outer surfaces of the slip rings 25 and 26 as the slip rings ate rotated. The brush holder 30 and the slip ring cover 50 are assembled together to form a one-piece unit for covering the slip rings 25 and 26, and when the rear cover 63 is fixed, are pressed against the rear frame 2 through seal members 70 and 71 which are made of rubber and arranged on opposite end faces, in the axial direction of the shaft 11, of the brush holder 30 and the slip ring cover 50.

The structure and assembling of the brush holder 30 and the slip ring cover 50 will now be described.

Figure 2:
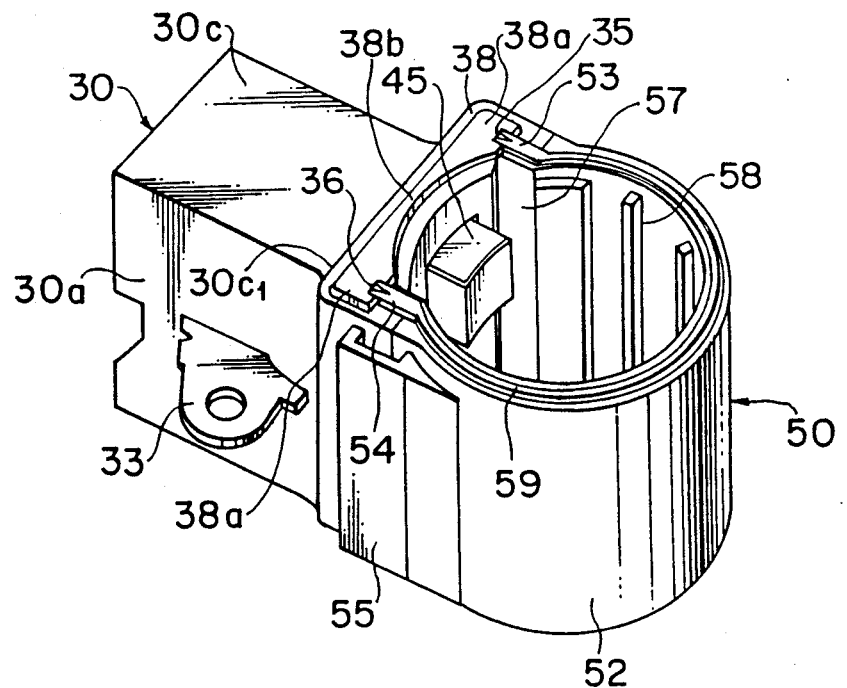
FIG. 2 is a perspective view showing a brush holder and a slip ring cover in the assembled state, which are used in the embodiment shown in FIG. 1.
Figure 3:
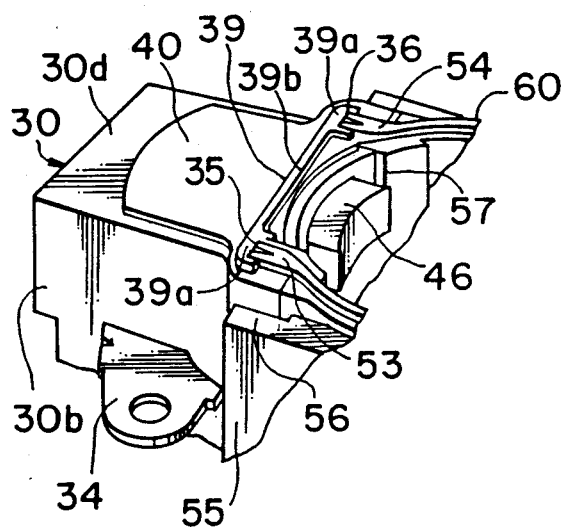
FIG. 3 is a perspective view showing the other axial end face of the assembly shown in FIG. 2.
Figure 4:
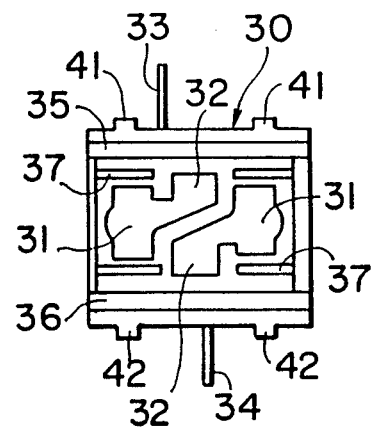
FIG. 4 is a front view of the brush holder shown in FIG. 2.
Figure 7:
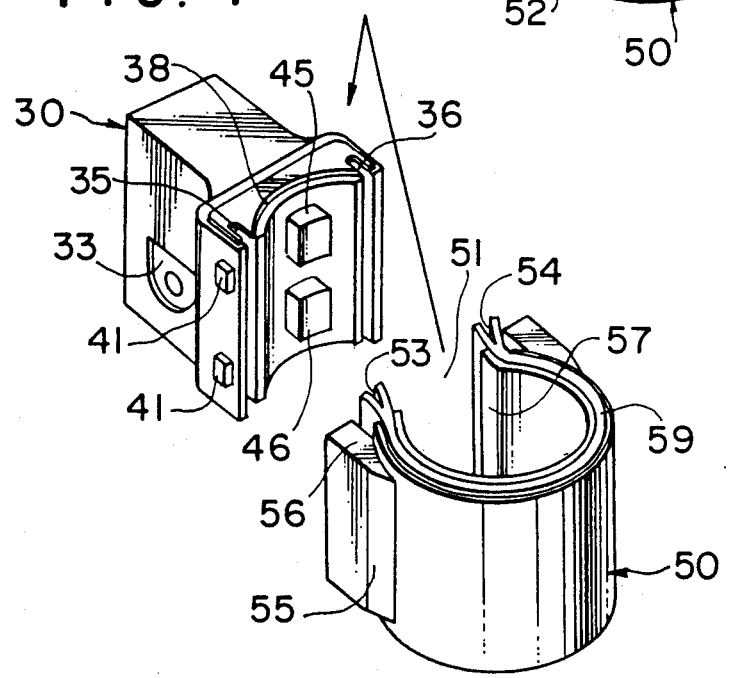
FIG. 7 a view for explanation of the assembling of the brush holder and the slip ring cover shown in FIG. 2.
Figure 7A:
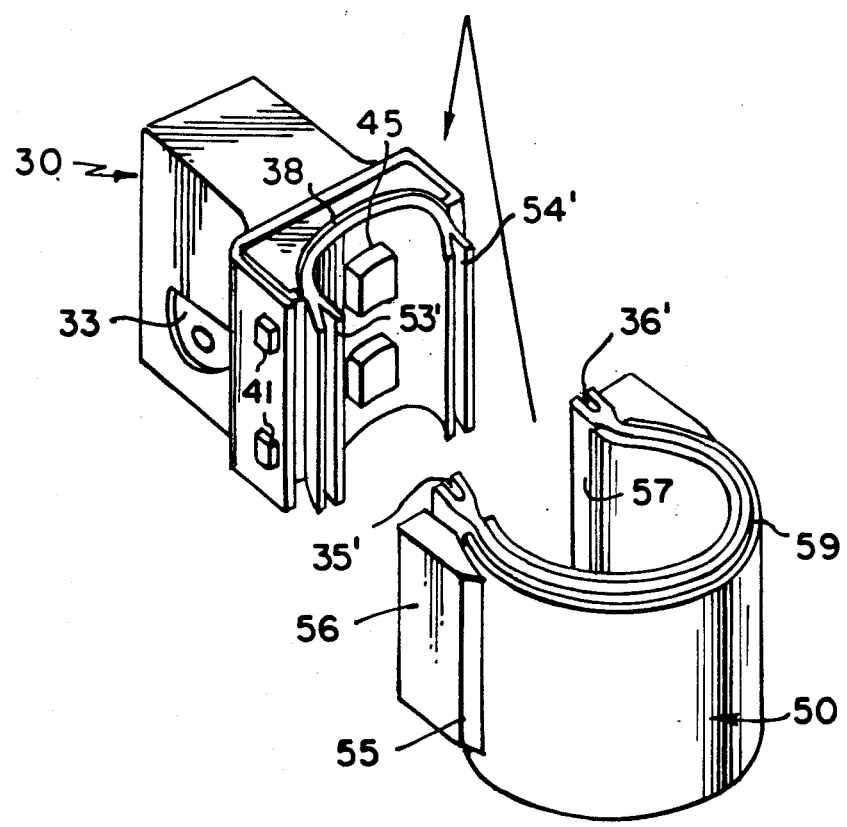

A body of the brush holder 30 is made of synthetic resin, and is substantially box-shaped with an enlarged portion at one end thereof on the slip ring cover side as shown in FIGS. 2, 3 and 7. The body of the brush holder 30 has first receiving portions 31 for receiving the brushes 45 and 46 and second receiving portions 32 for receiving the pigtails 49. There are provided two first receiving portions 31 and two second receiving portions 32 as shown in FIG. 4, so that they hold the brushes 45 and 46 side-by-side in the axial direction. The brush holder 30 is molded with a plus terminal 33 and a minus terminal 34 that are made of metal plates and are projected from opposite circumferential side walls 30a and 30b of the brush holder, respectively. These plus and minus terminals have holes perforated for mounting the brush holder 30 on the alternator.

Figure 5:
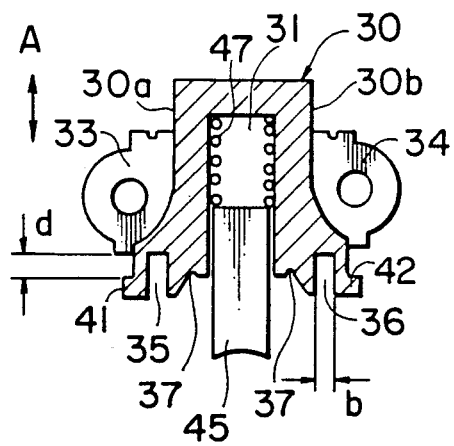
FIG. 5 is a cross-sectional view of the brush holder shown in FIG. 4.

The enlarged portion of the body of the brush holder 30 has a front surface curved along the circumferential surfaces of the slip rings 25 and 26. The first and second receiving portions 31 and 32 are opened in the curved surface of the enlarged portion. As shown in FIGS. 4 and 5, recesses 35 and 36 are formed in the enlarged body portion close to the circumferentially opposite ends of the curved surface thereof, respectively. Each of the recesses 35 and 36 has a substantially rectangular cross section and extends in the axial direction over the entire length of the enlarged portion. Four shallow grooves 37 each extending in the axial direction are formed inside the recesses 35 and 36 in the curved surface of the brush holder body.

A step 30C₁ is formed in one of the axial end faces of the brush holder 30 as shown in FIG. 2, so that the axial end face of the enlarged body portion is at a higher level than the other end face 30C of the brush holder. A first small projection 38 having a height of about 0.5 mm is formed on the raised end face of the enlarged body portion. The small projection 38 consists of a pair of projected portions 38a, 38a, each of which has a U-shape for surrounding the axial end of the recess 35 or 36, and an arcuate projected portion 38b for connecting these projected portions 38a, 38a. On the other hand, a slightly raised flat land 40 is formed on the other axial end face 30d of the brush holder 30 as shown in FIG. 3. The flat land 40 has an area that is about two thirds of the overall area of the end face 30d. A second small projection 39 consisting of a pair of projected portions 39a, 39a and an arcuate projected portion 39b is provided on the flat land in the same manner as in the opposite side end face of the brush holder. Furthermore, as best shown in FIG. 7, a pair of detents 41 or 42 spaced from each other in the axial direction are formed on each of the circumferential sides of the enlarged body portion of the brush holder 30.

As shown in FIG. 1, the brushes 45 and 46 are received in the first receiving portions 31 of the brush holder 30 together with the brush springs 47 and 48, respectively. Also, the pigtails 49 are received in the second receiving portions 32 with their ends being the brushes 45 and 46 from falling out of the holder and at the same time electrically connecting the brushes 45 and 46 to the terminals 33 and 34, respectively.

Figure 6:
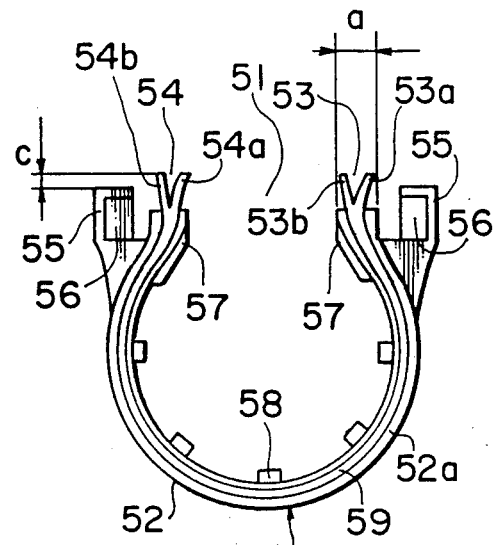
FIG. 6 an end face view of the slip ring cover shown in FIG. 2.

The slip ring cover 50 serves as a cover member for covering and protecting the slip rings 25 and 26 of the shaft 11, and are made of thermoplastic resin such as nylon or the like. As shown in FIG. 6, the slip ring cover 50 comprises a cylindrical portion 52 which is provided at its side with an opening 51 for passage of the brushes 45 and 46, and which covers the slip rings 25 and 26 through about three quarters of the entire circumference thereof. Projections 53 and 54 each extending in the axial direction are formed at both the side edges of the cylindrical portion 52 so as to engage with the recesses 35 and 36 of the brush holder 30. As shown in FIG. 6, each of the projections 53 and 54 is composed of a pair of projected segments 53a, 53b or 54a, 54b that have a relatively small thickness and that are arranged in a V-shape. Projections 55 of hook-like cross-section are formed on the outsides of the projections 53 and 54 of the cylindrical portion 55, respectively. These projections 55 are to be engaged with the projections 41, 42 of the brush holder 30 when the slip ring cover 50 and the brush holder 30 are coupled to each other. Provided at one axial end of each projection 55 is a retaining portion, as indicated by reference numeral 56 in FIG. 7, which is brought into abutment with the detent 41 or 42 of the brush holder 30 for limiting the axial movement of the slip ring cover 50.

Inner portions 57, 57 of the projections 53 and 54 of the slip ring cover 50 are made flat to conformity with the inner surfaces of the recesses 35 and 36 of the brush holder 30, thereby facilitating the engagement with the brush holder 30. Also, a plurality of rod-like projections 58 each extending in the axial direction are formed on the inner circumferential wall of the cylindrical portion 52.

Furthermore, a small projection 59 or 60 having a height of about 0.5 mm and a width of about 0.5 mm is integrally framed on and along each axial end face 52a of the cylindrical portion 52 in the same manner as the small projections 38 and 39 of the brush holder 30. Also, the projections 53 and 54 are projected by about 0.5 mm from both the end faces 52a and are continuous with the small projections 59 and 60, respectively.

As shown in FIGS. 5 and 6, the width a of each projection 53 or 54 is somewhat larger than the width b of each recess 35 or 36 of the brush holder 30. Also, a distance c between a distal end of each hook-like projection 55 and the tip end of the associated projection 53 or 54 is set to be slightly larger than a distance d between the bottom of each recess 35 or 36 and the end of the associated detent 41 or 42.

The thus constructed brush holder 30 and slip ring cover 50 are assembled together in the following manner. First of all, as indicated by an arrow in FIG. 7, the respective projections 53 and 54 of the cover 50 are inserted into the recesses 35 and 36 of the brush holder 30. At the same time, the projections 55 of the cover 50 ride over the detents 41 and 42 of the brush holder 30. In this case, since the width a is larger than the width b as described above, the cover 50 is pressingly inserted into the holder 30. Also, since the distance c is larger than the distance d, when the projection segments 53a, 53b, 54a and 54b are inserted into the recesses 35 and 36 of the brush holder 30, respectively, the tip ends of the projection segments 53a, 53b, 54a and 54b are pressingly fitted to the corner portions of the bottoms of the recesses 35 and 36 at a predetermined pressure.

Moreover, as the hook-like projections 55 of the cover 50 are engaged with the detents 41 and 42 of the brush holder 30, the posture of the cover 50 relative to the brush holder 30 is kept accurate or exact. Also, the retaining portions 56 of the hook-like projections 55 are brought into contact with end faces of the detents 41 and 42, thereby performing the positioning between the brush holder 30 and the cover 50.

Furthermore, under the assembled condition, the axial length of the brush holder 30 is substantially coincident with that of the cover 50. The height of the first small projection 38 of the brush holder 30 is substantially the same as that of the small projection 59 of the cover 50, and the height of the second small projection 39 of the brush holder 30 is substantially the same as that of the small projection 60 of the cover 50.

As a result, the recesses 35 and 36 of the brush holder 30 are engaged in intimate contact with the V-shaped projections 53 and 54 of the slip ring cover 50. It is possible to ensure the satisfactory seal between the assembled portions of the brush holder 30 and the slip ring cover 50 without any other seal member.

Referring now to FIGS. 1, and 8 to 12, the assembling of the thus coupled brush holder 30 and cover 50 relative to the alternator and the structure therefor will be described.

Figure 9:
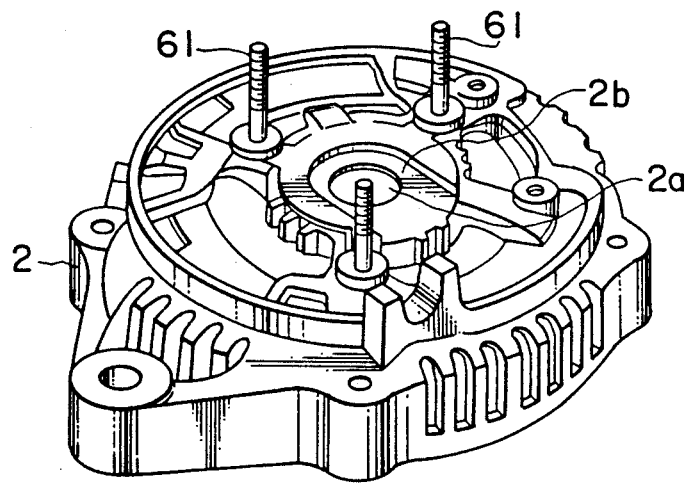
FIG. 9 is a perspective view showing a rear frame used in the generator shown in FIG. 1.
Figure 10:
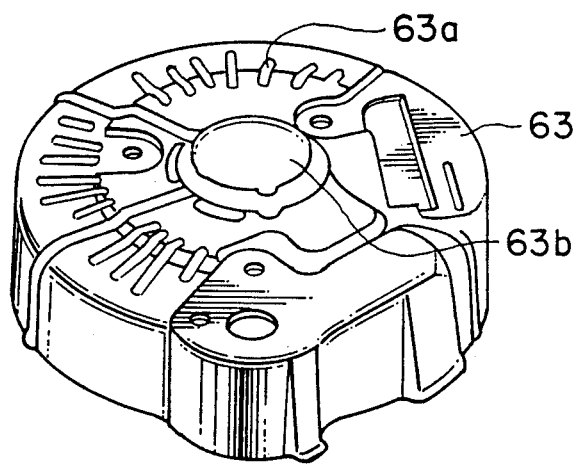
FIG. 10 is a perspective view showing a rear cover used in the generator shown in FIG. 1.

As can be seen in FIG. 9, a seat 2b against which pressed are the brush holder 30 and the cover 50 is formed around a central hole 2a of the rear frame 2 through which the shaft 11 is to be passed.

Figure 11:
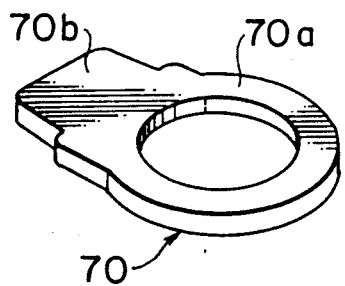
FIGS. 11 and 12 are perspective views showing seal members used along with the assembly shown in FIG. 2.

FIG. 11 shows a first seal member 70 which is to be interposed between the rear frame 2 and the brush holder 30 and cover 50 assembly. The seal member 70 is made of foamed silicone rubber, and is composed of an annular portion 70a that is to be brought into contact with one axial end face 52a of the cover and a rectangular portion 70b that is to be brought into contact with the flat land 40 of the brush holder 30.

Figure 12:
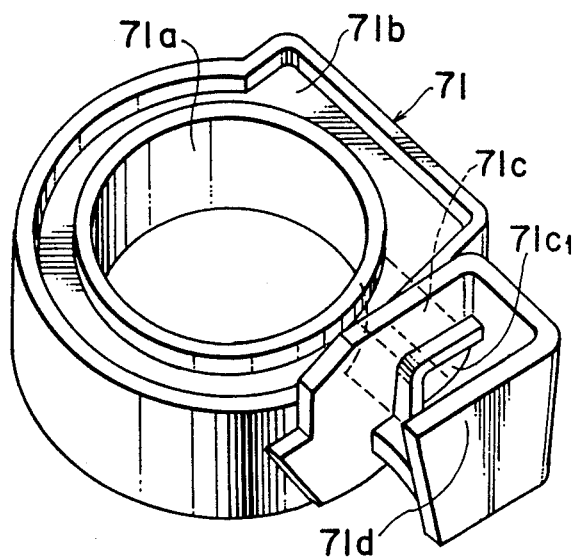

On the other hand, a second seal member 71 to be interposed between the rear cover 63 and the assembly of the brush holder 30 and the cover 50 is shown in FIG. 12. The second seal member 71 is also formed of rubber. The second seal member 71 is composed of a bottomed cylindrical portion 71a for covering the end portion of the shaft 11, a circumferential groove 71b against which contacted are the first small projection 38 of the brush holder and the other end face 52a of the cover 50, a passage 71c for connecting the inside and outside of the cylindrical portion 71a as indicated by dotted lines in FIG. 12, and a cover portion 71d for covering the passage 71c and an outlet 71C₁ thereof.

Figure 13:
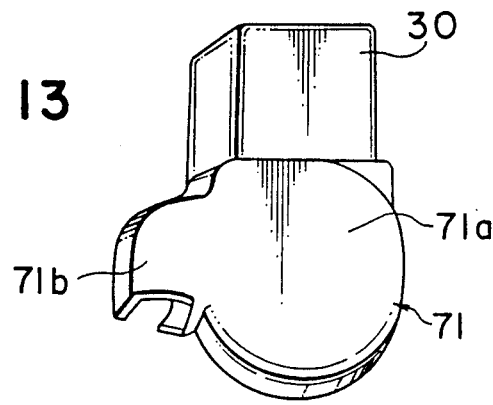
FIG. 13 is a perspective view showing the seal member shown in FIG. 12 in the mounted state on the assembly shown in FIG. 2.

FIG. 13 shows the second seal member 71 in the state of having been mounted on the brush holder 30 and the cover 50. As is apparent from FIG. 13, the axial opening of the cover 50 is covered by the cylindrical portion 71a of the seal member 71. The groove 71b of the seal member 71 is engaged with the step 30C₁ of the brush holder 30. Then, the inside and outside of the cover 50 are in communication with each other through the passage 71c of the seal member 71. The entrainment or invasion of water, oil or the like into the passage 71c may be prevented by the cover portion 71d.

Figure 8:
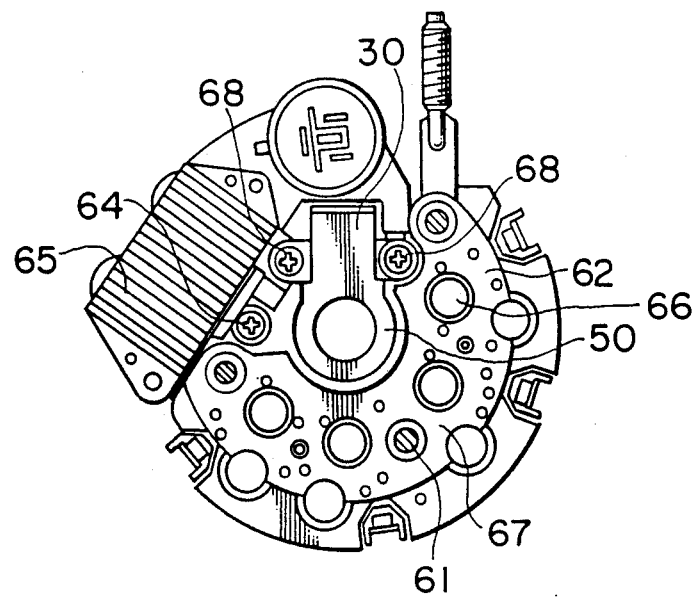
FIG. 8 is a side elevational view showing the assembled state of the brush holder shown in FIG. 2 to the generator.

As shown in FIG. 9, three bolts 61 are fixedly provided on the rear frame 2. By means of these the bolts 61, the rectifier 61 is first positioned in place on the rear frame 2. The IC regulator 65 is fastened on the rectifier 62 by bolts 64. Subsequently, the seal member 70 is positioned on the seat 2b of the rear frame 2. As shown in FIG. 8, the brush holder 30 assembled with the cover 50 are fastened at the plus and minus terminals 33 and 34 to the rectifier 62 and the IC regulator 65 by screws 68, respectively. The rectifier 62 serves to rectify the output current of the stator coil 6, and is composed of a plurality of diodes 66 and cooling fins 67. The IC regulator 65 serves to control the output voltage of the alternator by adjusting an excited current to the rotor coil 14.

The second seal member 71 is positioned on the brush holder 30 and the slip ring cover 50, and subsequently, the rear cover 63 provided with cooling air absorption holes 63a (see FIG. 10) is mounted thereover. As shown in FIG. 1, the rear cover 63 is fastened together with the rectifier 62 to the rear frame 2 by the bolts 61 and nuts 69. As a result, the rear cover 63 presses the second seal member 71 in the axial direction, and further presses the first seal member 70 through the brush holder 30 and the cover 50.

The first seal member 70 is elastically deformed between the seat 2b of the rear frame 2 and the flat land 40 of the brush holder 30 and the axial end face 52a of the cover 50, and are in intimate contact with these components to seal the same. Incidentally, since a difference in level between the small projection 60 of the cover 50 and the brush holder 30 is decreased by providing the flat land 40 on the brush holder 30, it is possible to decrease the slat between the brush holder 30 and the cover 50 to enhance the seal effect when the brush holder 30 and the cover 50 are positioned on the seat 2b of the rear frame 2 through the first seal member 70. Also, the second seal member 71 is interposed between the brush holder 30 and cover 50 and a seat 63b (see FIG. 10) provided on the rear cover 63 to seal the former.

It is thus possible to completely seal the peripheral portions of the cover 50 and the brush holder 30 only by means of axial pressure, thereby preventing the oil or water from entering the sealed portion.

The advantages enjoyed by the foregoing embodiment will be described.

First, the first and second small projections 38 and 39 and the small projections 59 and 60 are formed on the respective axial end faces of the brush holder 30 and the cover 50, whereby these projections 38, 39, 59 and 60 are pressed against the first and second seal rubbers 70 and 71 to thereby prevent oil or water from entering into the cylindrical portion 52 of the cover 50 without fail.

Second, since the thin plate-like projections 53a, 53b, 54a and 54b formed in the cover 50 are engaged with the recesses 35 and 36 of the brush holder 30 at a predetermined pressure, even if oil or water enters through gaps between the hook-like projections 55 and the brush holder 30, it is possible to reliably prevent the oil or water from entering into the space wherein the brushes 45 and 46 and so forth lie, by the thin plate-like projections 53a, 53b, 54a and 54.

Third, as shown in FIGS. 3, 4 and 5, since the shallow grooves 37 are formed around the first receiving portions 31 into which the brushes 45 and 46 are inserted, even in the case where a small amount of oil or water would enter through the thin plate-like projections 53a, 53b, 54a and 54b into the cover 50, the oil or water stagnates in the shallow grooves 37 to thereby be completely prevented from adhering to the brushes 45 and 46.

As shown in FIG. 4, the pairs of detents 41 and 42 are spaced from each other without facing the plus and minus terminals 33 and 34, whereby the brush holder 30 may be insert-molded in a two-divided manner in the direction indicated by the arrow A in FIG. 5. Therefore, it is very easy to form the brush holder 30.

Also, since the cover 50 is shaped as shown in FIG. 6 and it is possible to injection-mold the cover 50 in a two-divided manner in the direction perpendicular to the paper surface of this figure, it is easy to form the cover 50 as is in the case of forming the brush holder.

Then, simply by assembling the above-described brush holder and cover 50, it is possible to readily provide the brush holder 30 on which mounted is the cover 50 surrounding the slip rings 25 and 26.

Although in the foregoing embodiment, the projections 53 and 54 are formed on the cover 50 and the recesses 35 and 36 are formed in the brush holder 30, it is apparent that the recesses may be formed in the cover and the projections may be formed on the brush holder to bring the same effect.

Also, the projections 53 or 54 are formed of the two projection segments 53a, 53b or 54a, 54b. The number of the projection segments may be one or three or more.

Automotive alternators in accordance with second and third embodiments of the invention will now be described with reference to FIGS. 14 to 16. The structure of the first embodiment may be equally applied to those of the second and third embodiments except for the brush holder and the slip ring cover. Thus, the description will be made only on the difference between the second or third embodiment and the first embodiment, and the same reference numerals as used in the foregoing description on the first embodiment will be used to indicate the like components or parts of the second and third embodiments.

As described in conjunction with the first embodiment, it is preferable to mold the brush holder and the slip ring cover of synthetic resin in view of the manufacture cost and difficulty. However, there is a possibility that the plastic molded parts may have small dimensional variations relative to desired dimensions due to the molding condition, the difference in molding dies or the like.

Figure 15:
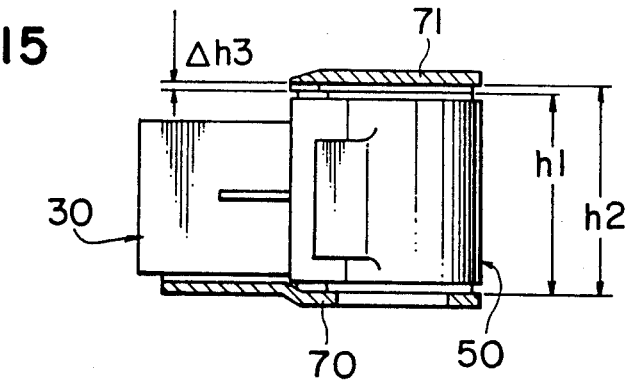
FIG. 15 is a side elevational view showing the seal members of FIGS. 11 and 12 in the mounted state to the assembly shown in FIG. 2.
Figure 16:
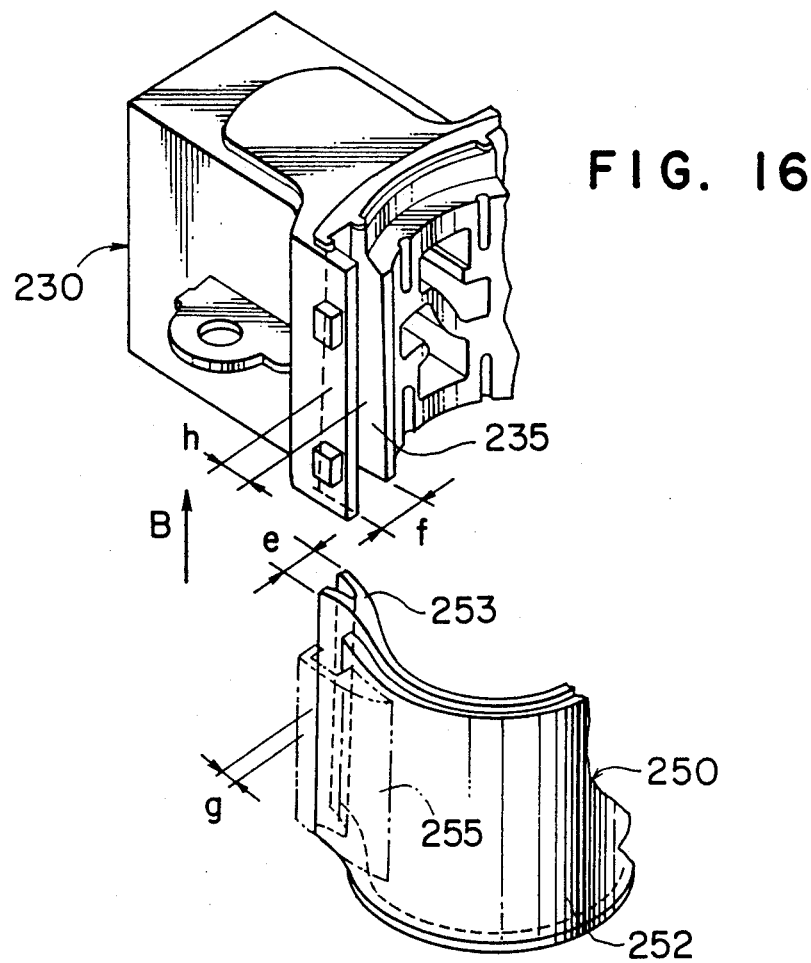
FIG. 16 is a fragmentary perspective view showing a brush holder and a slip ring cover used in an automotive alternator in accordance with a third embodiment of the invention.

In this case, as shown in FIG. 15, the axial length h1 of the recess 35 or 36 of the brush holder 30 and the axial length h2 of the projection 53 or 54 of the slip ring cover 50 would not be the same. Accordingly, when the recesses 35 and 36 of the brush holder 30 are engaged with the projections 53 and 54 of the slip ring cover 50, there would be produced a step Δh3 of, for example, about 0.4 mm in the axial direction.

Under such circumstances as described above water or dust would enter through a small gap of the step Δh3 even if the seal members 70 and 72 (the seal member 72 is schematically shown in FIG. 15) disposed on the opposite axial end faces of the holder and cover assembly are depressed in the axial direction.

Figure 14:
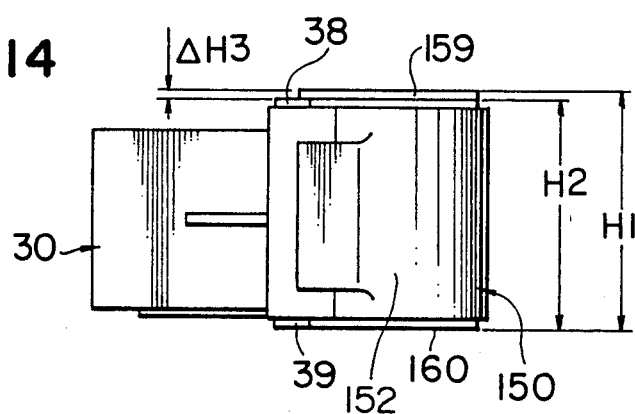
FIG. 14 is a side elevational view showing a brush holder and a slip ring cover used in an automotive alternator in accordance with a second embodiment of the invention.

In the second embodiment, as shown in FIG. 14, a slip ring cover 150 is dimensioned so that a length of the cylindrical portion 152 including small projections 159 and 160 formed on axially opposite end faces of the cylindrical portion 152, i.e., an axial length H1 of the V-shaped projections formed on both side edges of the cylindrical portion 152 is somewhat longer than the axial length H2 of the brush holder 30 including the small projections 38 and 39 by, for example, about 0.4 mm. Therefore, when the projections of the slip ring cover 150 are inserted into the recesses 35 and 36 of the brush holder 30, there is a difference ΔH3 in length therebetween.

When assembling the thus constructed brush holder 30 and the slip ring cover 150, the projections of the slip ring cover 150 are inserted into the recesses 35 and 36 of the brush holder 30 so as to couple the two components in the same manner as in the foregoing embodiment.

Thereafter, the small projection 159 or 160 of the slip ring cover 150 projected by ΔH3 from the projection 38 or 39 of the brush holder 30 is modified or shaved by means of a heat treatment so that the connection of the small projection of the slip ring cover with that of the brush holder is smoothed. Thus, the opposite axial end faces are made substantially flat when the brush holder 30 and the slip ring cover 150 are coupled to each other. It will be understood that, if the slip ring cover 150 is made of material having a lower melting point than that of the material of the brush holder 30, the heat treatment after the assembling is facilitated.

According to this embodiment, in addition to the advantages of the first embodiment, it is possible to make flat the opposite axial end faces of the brush holder and the slip ring cover after assembling thereof irrespectively of dimensional variations or errors caused during the plastic molding, and to ensure the contact of these components with the seal members. Accordingly, the seal of the protective structure may be further enhanced, and the brush holder and the slip ring cover may be manufactured at a low cost.

Incidentally, instead of the dimensional relationship of the second embodiment, the axial length of the recesses 35 and 36 of the brush holder 30 may be somewhat longer than the axial length of the projections of the slip ring cover 150, so that the step ΔH3 is made smooth by heat treatment of the axially projected portions of the brush holder corresponding to the recesses 35 and 36. In this case, the same advantages as in the second embodiment may be obtained. It is apparent that in this case, the brush holder 30 is preferably made of plastic material having a lower melting point than that of the slip ring cover 150.

An automotive alternator according to the third embodiment is different from the second embodiment in dimension of the engagement portions formed in the brush holder and the slip ring cover of the protective structure. Namely, as shown in FIG. 16, a recess 235 formed in the end of an enlarged body portion of a brush holder 230 has a width f and a depth h which are gradually decreased toward the axially inside, i.e., in the upper direction in FIG. 16. On the other hand, a V-shaped projection 253 provided at the side edge of a cylindrical portion 252 of a slip cover 250 is formed so that its width e and height q from a tip end of an hook-like projection 255 are gradually decreased in complementary relation with the shape of the associated recess 235. The widths and the heights of the recess 235 of the brush holder and the projection 253 of the slip cover are so selected that, upon the completion of the engagement therebetween, the end tips of the projection 253 are held in close contact with the bottom corners of the recess portions 235 at a predetermined pressure. Incidentally, although not shown in the drawing, the other recess of the brush holder and the other projection of the slip ring cover are formed in the same manner.

With this structure, when the brush holder 230 and the slip ring cover 250 are coupled to each other, it is possible to readily insert the projections 253 from the ends of the recesses 235. Thereafter, the brush holder 230 is pressed in a direction B in FIG. 16, so that the projections 253 and the recesses 235 are gradually firmly engaged with each other owing to a wedge effect. Therefore, according to the third embodiment, it is possible to readily assemble the brush holder and the slip cover together, to firmly couple the two components, and to thereby enhance the seal of the protective structure.

As described above, according to the present invention, the cover body for covering the slip rings is coupled to the brush holder with the axial projections and recesses of the slip ring cover and the brush holder being engaged in close contact with each other. As a result, the cover body and the brush holder are completely sealed by the engagement of the projections and the recesses. The brush holder on which the cover body is mounted is fastened to the alternator body through the first and second seal members while being subjected to an axial compression. The rear end of the cover body is pressed in the axial direction by the rear cover. As the axial compression causes the seal members, which are disposed on the opposite end faces of the cover body, to be elastically deformed and held in intimate contact with the rear frame, the brush holder and the like, the axially opposite end faces of the cover body may be completely sealed. Thus, according to the present invention, with a simple structure made by the combination of the cover and the brush holder, the seal of the structure may be completely performed only by the axial compression when the brush holder and the cover body are mounted on the alternator. It is possible to ensure the seal around the slip rings independently of the assembling precision.

Although the invention has been described on the basis of the specific embodiments, it should be understood that the invention is not limited solely to such specific forms, and that various modifications are possible to be made or the invention may take various other forms without departing from the spirit of the appended claims.

What is claimed is:

1. An automotive alternator comprising:
   a rotor around which a rotor coil is wound, said rotor having a rotary shaft adapted to be coupled to and driven by an automotive engine;
   a frame for encasing said rotor in a way such that a portion thereof extends out of said frame;
   slip rings provided at one end portion of said portion of said rotary shaft extending outside of the frame, said slip rings being electrically connected to said rotor coil;
   a plurality of brushes that are in sliding contact with said slip rings;
   a brush holder, having receiving portions for encasing said brushes and having a pair of first members which are one of recess portions and projection portions, formed on both sides of said receiving portions, respectively, and extending in an axial direction of said rotary shaft;
   a cover body disposed around an outer periphery of said slip rings, said cover body including a cylindrical portion having in a side wall thereof an opening through which said brushes extend and having an axial length which is similar to an axial length of said brush holder, said cylindrical portion having second members which are one of recess portions and projection portions that are sealingly engageable with said one of the recess portions and projection portions of said brush holder;
   one of said first and second members being said recess portions and the other being said projection portions, wherein each said recess portion has a rectangular cross-section with an open end and two edge corners spaced from said open end, wherein an end thereof into two parts, which respectively connect to said two edge corners;
   a rear cover for encasing said brush holder and said cover body;
   seal members interposed between said frame and said brush holder and cover body, and between said rear cover and said brush holder and cover body, respectively; and
   means for pressing said brush holder, said cover body and said seal members toward said frame in the axial direction by said rear cover to assemble said brush holder, said cover body, and said seal members.

2. The alternator according to claim 1, wherein said cover body and said brush holder are coupled to each other, and wherein small projections are respectively formed on axial end faces of said cover body and on axial end faces of said brush holder at which axial end faces said cover body and said brush holder are to be in contact with said seal members, respectively, and said small projections form closed loops as a whole.

3. The alternator according to claim 2, further comprising axial grooves, formed between one of said recess portions and said projection portions of said brush holder and said receiving portions thereof.

4. The alternator according to claim 2, further comprising a recess formed in an outer side surface of said frame for receiving said brush holder, a raised flat land having height smaller than a height of said small projections of said brush holder formed on a side surface of said brush holder facing said recess of said frame, wherein one of said seal members is pressed between said recess of said frame and said raised flat land of said brush holder and the axial side surface of said cover body.

5. An alternator as in claim 1 wherein a distance between said two parts of said end of said projection portion is larger than distance between the two edge corners of said recess portion with which said projection portion mate.

6. An automotive alternator for supplying an electric current from brushes which are in sliding contact with slip rings through said slip rings, comprising:
   a brush holder having receiving portions for encasing said brushes, a pair of recesses which are rectangular in cross section and open at one end, having two edge corners at another end respectively formed on both sides of said receiving portions and extending in an axial direction of the alternator, and detents provided on both axial side surfaces of said brush holder;
   a cover body including a cylindrical portion having an opening through which said brushes extend and an axial length similar to an axial length of said brush holder, said cylindrical portion having projections for engaging with said recess of said brush holder wherein each projection is formed of a deformable member with an end portion that has two parts, each said part coupled to one of said two edge corners of one of said recesses;
   seal members respectively provided on opposite axial end faces of said brush holder and said cover body; and
   means for forming an axial compression force which causes said slip rings to be sealed by said brush holder, said cover body and said seal members to thereby assemble said brush holder, said cover body and said seal members.

7. An alternator as in claim 6 wherein a distance between said two parts of said end of said projection portion is larger than a distance between the two edge corners of said recess portion with which said projection portion mates.

8. An automotive alternator comprising:

slip rings mounted on a rotary shaft for rotation therewith;

a brush holder having receiving portions for receiving brushes which are in sliding contact with said slip rings, and one of recesses and projections respectively formed as engagement portions on both sides of said receiving portions and extending in an axial direction of said rotary shaft;

a slip ring cover having engagement portions at both ends thereof adapted to be engaged with said one of said recesses and projections of said brush holder, one of said engagement portions on said brush holder or said slip ring cover being said recess portions and the other being said projection portions; wherein each said recess portion has a rectangular cross-section with two edge corners wherein each projection portion is a deformable thin member bifurcated at an end thereof into two parts, which respectively connect to said two edge corners, for covering said slip rings in cooperation with said brush holder;

seal members respectively disposed on opposite axial end faces of said brush holder and said slip ring cover which are coupled to each other with said one of said recesses and projections being engaged in intimate contact with said engagement portions of said slip ring cover; and means for applying a compression force in the axial direction to hold together said recesses and projections;

wherein one of said engagement portions of said brush holder and said slip ring cover are longer in axial length than the other engagement portions, said engagement portions of said slip ring cover being engaged with said engagement portions of said brush holder to form a portion of a predetermined axial length is produced between said different axial length engagement portions of said brush holder and said slip ring cover, and at least said one of said engagement portions of said brush holder and said slip ring cover longer than the other engagement portions in axial length are of a smoothed thermoplastic resin.

9. An automotive alternator for supplying an electric current from brushes which are in sliding contact with slip rings through said slip rings, comprising:

a brush holder having receiving portions for encasing said brushes, and having projections, each projection is formed of a deformable thin member with an end portion that has two parts;

a cover body including a cylindrical portion having an opening through which said brushes extend and an axial length substantially equal to an axial length of said brush holder, said cylindrical portion having a pair of recesses which are rectangular in cross section and open at one end, having two edge corners at another end respectively formed on both sides of said receiving portions and extending in an axial direction of the alternator, said projections of said brush holder for engaging with said recesses of said cover body, wherein each said part of said projections coupled to one of said two edge corners of one of said recesses;

seal members respectively provided on opposite axial end faces of said brush holder and said cover body; and means for forming an axial compression force which causes said slip rings are sealed by said brush holder, said cover body and said seal members to thereby assemble said brush holder, said cover body and said seal members.

* * * * *